(12) United States Patent
Rogne et al.

(10) Patent No.: US 6,595,063 B1
(45) Date of Patent: Jul. 22, 2003

(54) SENSOR ELEMENT ESPECIALLY FOR PRESSURE SENSORS

(75) Inventors: Henrik Rogne, Oslo (NO); Dag Torstein Wang, Oslo (NO)

(73) Assignee: Sintef, Trondheim (NO)

( * ) Notice: Subject to any disclaimer, the term of this patent is extended or adjusted under 35 U.S.C. 154(b) by 0 days.

(21) Appl. No.: 09/913,605

(22) PCT Filed: Feb. 11, 2000

(86) PCT No.: PCT/NO00/00053

§ 371 (c)(1),
(2), (4) Date: Aug. 16, 2001

(87) PCT Pub. No.: WO00/55589

PCT Pub. Date: Sep. 21, 2000

(30) Foreign Application Priority Data

Mar. 1, 1999 (NO) .......................................... 19991000

(51) Int. Cl.$^7$ ................................................. G01L 7/08
(52) U.S. Cl. ......................................................... 73/715
(58) Field of Search .......................... 73/706, 715–727, 73/756, 827, 838, 150 A, 150 R; 29/25.41; 361/283.1–283.4

(56) References Cited

U.S. PATENT DOCUMENTS

| | | | |
|---|---|---|---|
| 3,213,400 A | | 10/1965 | Gieb |
| 3,661,011 A | * | 5/1972 | Myrenne .................... 73/64.47 |
| 5,048,165 A | * | 9/1991 | Cadwell ..................... 29/25.41 |
| 6,050,138 A | * | 4/2000 | Lynch et al. ............... 73/150 A |

FOREIGN PATENT DOCUMENTS

| | | |
|---|---|---|
| DE | 33 27 653 A1 | 2/1984 |
| DE | 40 21 424 A1 | 1/1991 |
| DE | 40 24 780 A1 | 10/1991 |
| DE | 41 25 398 A1 | 2/1993 |
| DE | 42 15 722 A1 | 11/1993 |
| EP | 0 385 574 A1 | 9/1990 |
| EP | 0 454 901 A1 | 11/1991 |

\* cited by examiner

*Primary Examiner*—William Oen
(74) *Attorney, Agent, or Firm*—Rothwell, Figg, Ernst & Manbeck

(57) ABSTRACT

A system and corresponding method for bulge testing films (e.g. thin films, coatings, layers, etc.) is provided, as well as membrane structures for use in bulge testing and improved methods of manufacturing same so that resulting membrane structures have substantially identical known geometric and responsive characteristics. Arrayed membrane structures, and corresponding methods, are provided in certain embodiments which enable bulge testing of a film(s) over a relatively large surface area via a plurality of different free-standing membrane portions. Improved measurements of film bulging or deflection are obtained by measuring deflection of a center point of a film, relative to non-deflected peripheral points on the film being tested. Furthermore, membrane structures are adhered to mounting structure in an improved manner, and opaque coatings may be applied over top of film(s) to be bulge tested so that a corresponding optical transducer can more easily detect film deflection/bulging. In certain embodiments, a laser triangulation transducer is utilized to measure film deflection/bulging.

12 Claims, 5 Drawing Sheets

SENSOR ELEMENT ESPECIALLY FOR PRESSURE SENSORS

BACKGROUND OF THE INVENTION

1. Field of the Invention

The present invention relates to a sensor element, especially for pressure sensors, comprising a first membrane mounted in a rigid frame, said membrane being in pressure communication with two volumes between which a pressure difference is to be measured.

2. Description of the Related Art

Pressure sensors are increasingly more popular for different purposes, from measuring pressure in car tires to pressure measurements during drilling operations at sea. Pressure sensors are in increasing degree made from semiconductor materials, such as silicon, using techniques for micro machining.

The pressure sensors usually consists of a membrane or similar between two volumes between which the pressure difference is to be measured, one of the volumes usually having a reference pressure or possibly a slowly changing pressure.

At pressure differences the membrane is bent, at least along the edges. The bending is measured using strain sensitive piezoelectric elements being positioned in the areas of the membrane being deformed.

There exists a number of different types of such sensors, e.g. as described in the German patents DD 267,107, DD 286,222 and DD 291,398, as well as U.S. Pat. No. 5,174,690. In a number of these publications the sensors are coupled to each others in pairs, so that one is mounted in parallel with the implied strain and the second is mounted perpendicular to this direction. Through a bridge coupling the changes in the characteristics of the sensors, e.g. resistivity, are measured indicating the degree of deformation and thus the pressure.

A problem related to this type of pressure sensors is that they have a limited measuring range. When the pressure (or pressure difference) exceeds a critical value the bending strain in the edge of the membrane will result in breaking of the membrane.

A way to avoid this is to stop the membrane when a certain pressure is exceeded, e.g. by providing a support surface, as shown in DD 291,398. This will, however often reduce the sensitivity of the membrane and increase its complexity.

SUMMARY OF THE INVENTION

In the present invention the problem is solved in a different way, as the area being subject to bending strain is moved from the soft to the rigid membrane as the pressure increases. since the material withstands stretch better than bending the membrane will not break. By also measuring the bend in the stiff membrane an extended measuring range is obtained compared to measurements performed with a conventional membrane.

It is an object of this invention to provide a sensor element which may be produced with ordinary production methods and which has an extended sensitivity range relative to the known solutions. It is also an object of this invention to provide a sensor element with a simplified overload protection. To obtain these goals a sensor element is provided as described above being characterized as described in claim 1.

BRIEF DESCRIPTION OF THE SEVERAL VIEWS OF THE DRAWINGS

The invention will be described in detail below with reference to the accompanying drawings, illustrating embodiments of the invention by way of examples.

DETAILED DESCRIPTION OF THE PREFERRED EMBODIMENTS

Figure 1:
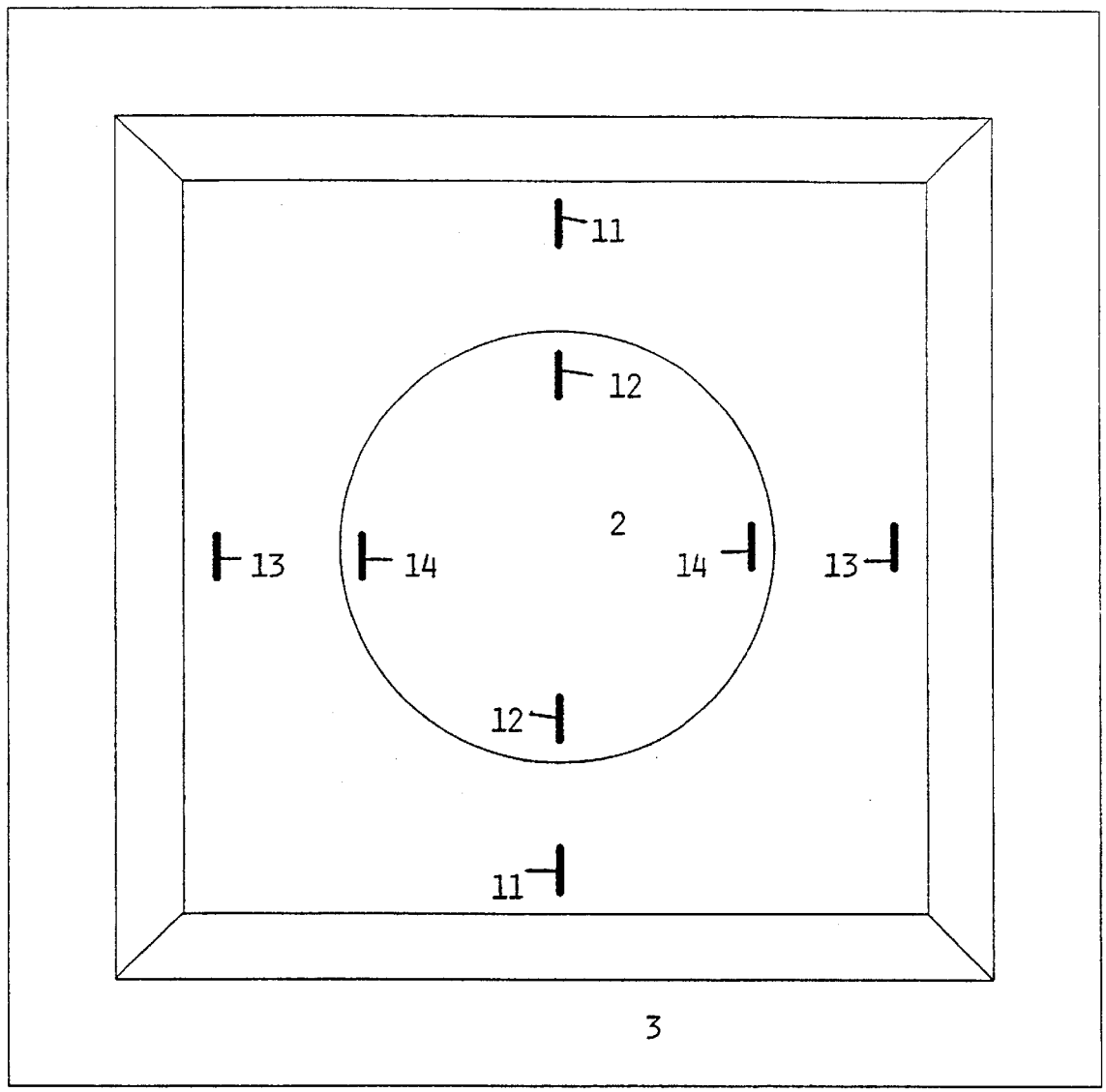
FIG. 1 shows a sensor element according to a first embodiment of the invention.

FIG. 1 shows a sensor element according to the invention consisting of a first membrane 1 in a frame 3. Centrally positioned on the first membrane 1 is a second membrane 2 with reduced stiffness relative to the first.

The membranes 1,2 are preferably symmetrically shaped for providing an even distribution of the strain along the whole circumference, thus reducing the danger of fractures in the material at large pressures. The central, second membrane 2 is preferably circular, but may also be quadratic or have an other shape, depending on the contemplated use and production method.

In the outer part of the first membrane a number of sensors 11,13 are positioned, and a second number of sensors 12,14 are positioned in the outer part of the second membrane 2. The sensor positions are chosen from known models for the maximum bend experienced by the membrane when being subject to a pressure from one side. An example showing such a model is shown in the abovementioned U.S. Pat. No. 5,174,690.

In an known way the sensors, 11,13 and 12,14 respectively, may be positioned in pairs with directions parallel and perpendicular to the direction of the bend, so as to make the most of the sensors sensitivity in a bridge coupling. The sensors 11,12,13,14 may be of any known type, but is according to a preferred embodiment of the invention piezo resistive elements.

In the drawings the pairs 11,13 and 12,14 are spaced at a certain distance apart, which because of the symmetrical design of the membranes will not affect the measurements. In order to obtain a balanced bridge two of the sensors 11,13 in each bridge is positioned with a radial orientation and the latter two is oriented tangentially. As the bend is essentially radial the radial piezoelectric sensors will have less resistivity while the tangential will have increased resistivity.

In its simplest form the pressure sensor is provided with 4 coupling points for each measuring bridge. One may then connect a power source to the input and read the signal through the output. From calibrations curves for the two measuring bridges one may the find the real pressure. A number of commercial units are available for this purpose. Of illustration considerations the electrical conductor couplings and similar are not shown in the drawings.

A more advanced solution comprises having the pressure sensor integrated in an ASIC chip reading the signals from both measuring bridges and calculating the pressure based on a calibration curve. The calculated pressure value may then be read in a digital or analog form.

As an alternative to the sensors positioned on the membranes other methods may be used to measure the bend. For example optical measuring methods may be utilized in which the changes in distance to the centre of the membrane or changes in the angle or material characteristics in the bent areas may be contemplated. Capacitive measurements of the distance to the membrane from a reference point may in some cases also be considered.

Figure 2:
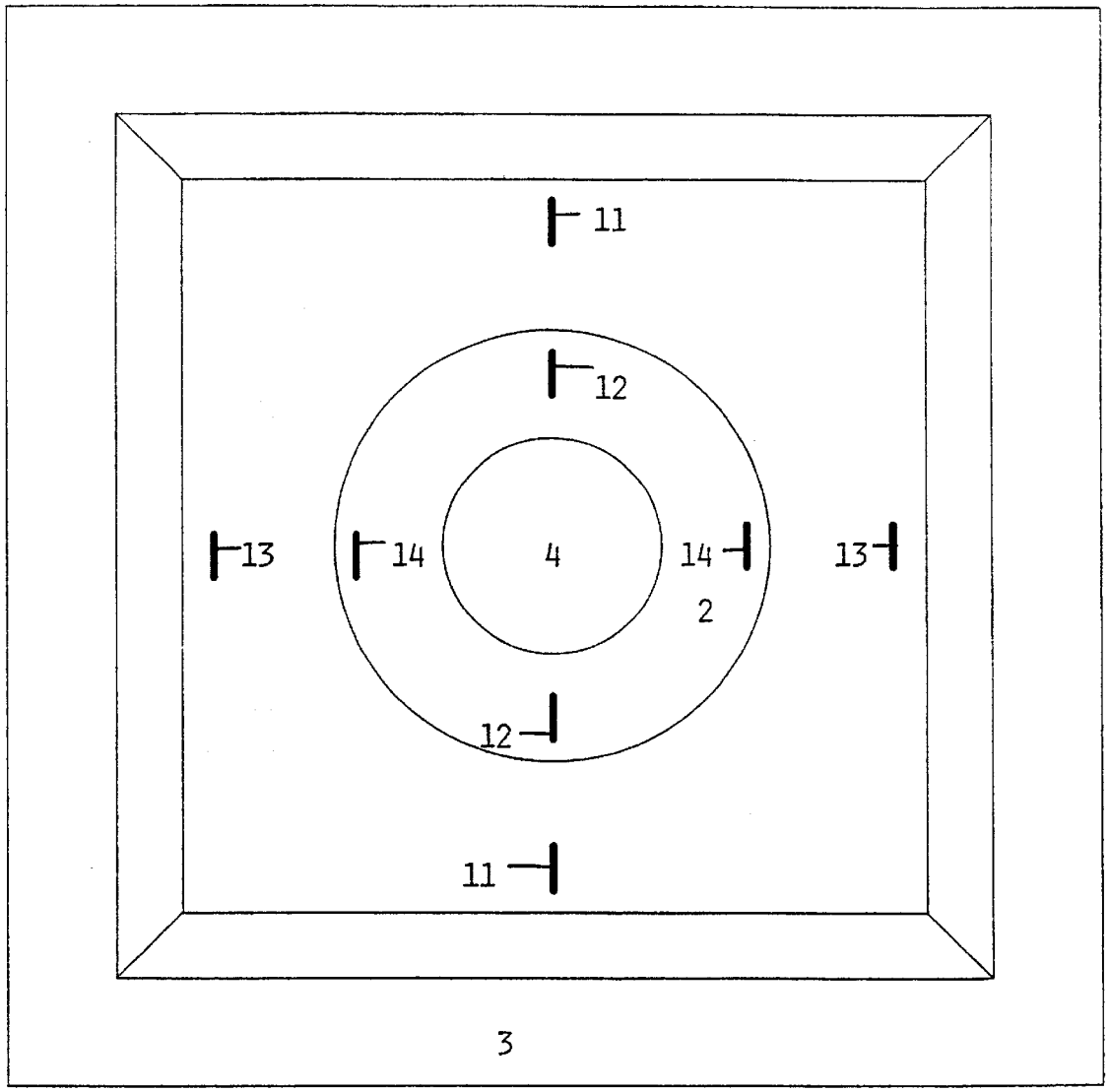
FIG. 2 shows a sensor element according to a second embodiment of the invention.

In FIG. 2 a sensor element similar to the one in FIG. 1 is illustrated, but in which the second membrane comprises a central area 4 with a larger stiffness than the second membrane 2.

Figure 3A:
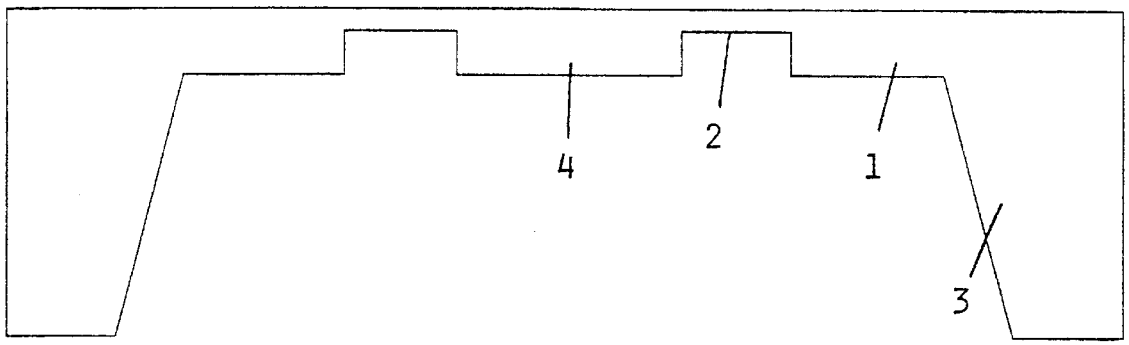
FIGS. 3A and 3B shows the cross sections of the embodiments in FIG. 2 and 1, respectively.
Figure 3B:
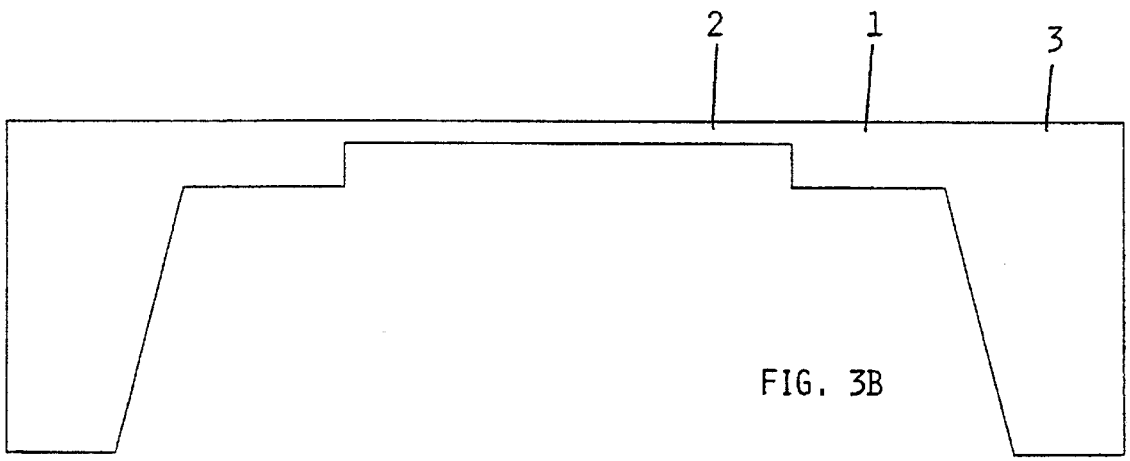

In FIGS. 3A and 3B the cross sections of the embodiments in FIGS. 2 and 1, respectively, are shown, the stiffness in which are, according to a preferred embodiment of the invention, chosen by adapting the thickness of the membranes. Altering of the material characteristics to change the stiffness is also possible, but will give less flexibility, among other things because of the obtainable differences in stiffness.

For cost-effective production, high sensitivity and small physical dimensions silicone will be a suitable material for producing the sensor element. The membranes 1,2 are produced by etching the back side of a silicon wafer, while the bend is measured by piezo resistive sensors 11,12,13,14 implanted in the front side of the membranes.

Typical physical dimensions of the membranes shown in FIGS. 3A and 3B may for example be:

The thick membrane 1 being approx. 24 $\mu$m.

The thin membrane 2 being approx. 3 $\mu$m.

The 24 $\mu$m thick membrane has 4 mm side lengths.

The 3 $\mu$m thin membrane has 2 mm side lengths, or 2 mm diameter if it is circular.

In the embodiments having a rigid mid section the side length/diameter is 1 mm.

The wafer thickness is typically 500 $\mu$m.

The transition from full waver thickness to 24 $\mu$m membrane stretching over 280 $\mu$m, perpendicular to the edge.

The transition from 24 $\mu$m membrane til 3 $\mu$m membrane is approx. 100 $\mu$m.

These dimensions may of course be varied in order to maximize the sensor for different purposes and depends on the process being used.

If the sensor element according to the invention is made from silicon it may be produced using well known micro mechanical processes, comprising partial processes like:

Photo lithography.

Silicon oxidation.

Depositing of a surface layer.

Epitaxial growth of surface layers.

Implanting for conductors, resistors, and etch stops with suitable atoms.

Diffusion of implanted atoms.

Etching for making mechanical structures, said etching process stops against doped areas.

Producing a sensor element according to this invention typically follows the following steps:

Growing of silicon on a silicon substrate wafer in which the silicon is isolated with an oxide.

Making conductors and resistors.

Rough etching of a 24 $\mu$m thick membrane from the back side.

Fine etching of the 3 $\mu$m thin structures in the 24 $\mu$m thick membrane.

More in detail this may be performed as follows:

Processing of electrical conductors and resistors, as well as etch stops:

N-type dope atoms are implanted in the surface of the wafer. These areas are defined by a photographic mask, and the depth is defined by diffusion parameters.

Buried conductors are implanted with p-type atoms.

A silicon surface layer is grown epitaxial on the surface. This is grown with n-type doping atoms.

$SiO_2$ is grown on the surfaces. Both upper and lower.

Surface conductors are implanted through the oxide.

The atoms are of p-type. This is followed by a thermal diffusion.

Surface resistors are implanted through the oxide. The atoms are of p-type. This is followed by a thermal diffusion.

Implanting of n-type doping atoms for etch stops. Followed by thermal diffusion.

Contact holes are prepared by opening the silicon. These are defined by a mask.

Metal conductors and metal contacts are deposited. Defined by a mask.

Etching of the membranes:

The back side oxide is opened. Defined with a mask.

Rough etching of the silicon substrate defined by an oxide mask and the crystal directions of the substrate. In the same step also comprises the fine etching} which is performed using a p-n stop.

The process of each step will be obvious to a person known to the art and will not be described in any further detail here.

Figure 4A:
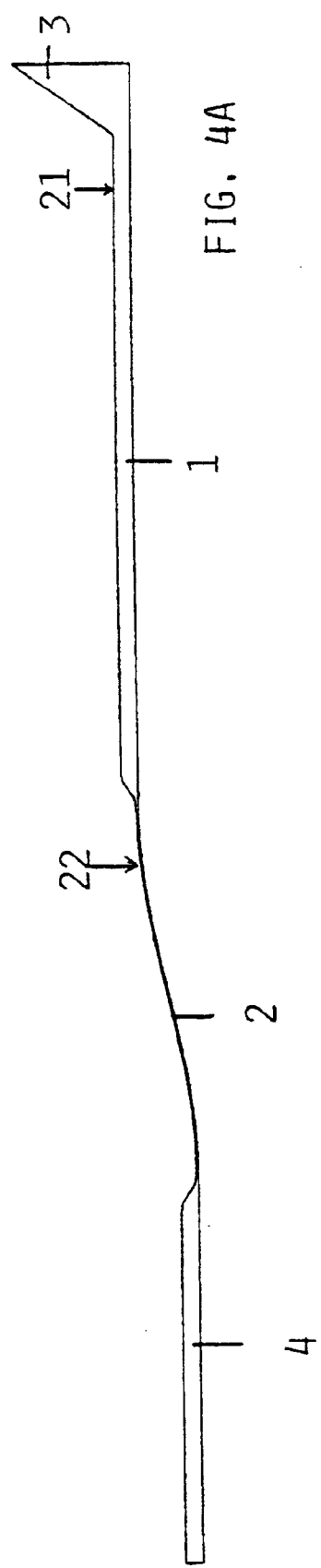
FIGS. 4A and 4B shows partial cross sections of the sensor elements illustrated in FIGS. 2 and 3A, under different pressure loads.
Figure 4B:
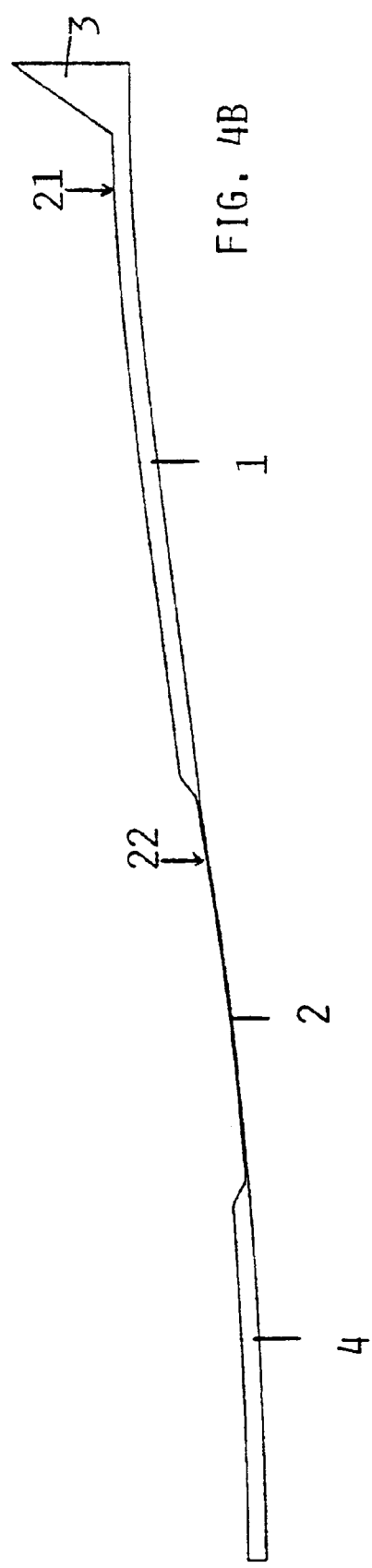

FIGS. 4A and 4B shows a cross section of an embodiment corresponding to the one shown in FIG. 3A} under the influence of different pressures. The first and the second membranes 1}2 are bent in a first and a second area 21 22 when subject to the different pressures.

In FIG. 4A a relatively low pressure is provided from 30 above} so that the bending of the first membrane is small. The second membrane 2 is, however, bent with a maximum in the second area 22. In this area sensors may advantageously be positioned.

A corresponding curvature is obtained closer to the central membrane part 4, and it will be possible to position sensors in this parts as well. There will, however, be some problems related to positioning of electrical conductors on the thin membrane 2, with resulting changes in the membrane stiffness} making this solution less advantageous. In addition the proximity to the membrane centre will result in reduced accuracy, as the stretch in the material over the area being covered by each sensor will have a larger directional spread.

FIG. 4B shows the sensor element being subject to a relatively high pressure in which the rigid first membrane 1 is bent in the first area close to the frame where the sensors advantageously may be positioned. The previously bent second area 22 in the second membrane 2 has, however, been straightened out and is subject to a simple stretch. As the tension gives a more homogeneous strain on the material the membrane may be subject to a larger pressure then what would be the case if the thin membrane 2 was coupled directly to a frame.

Figure 5:
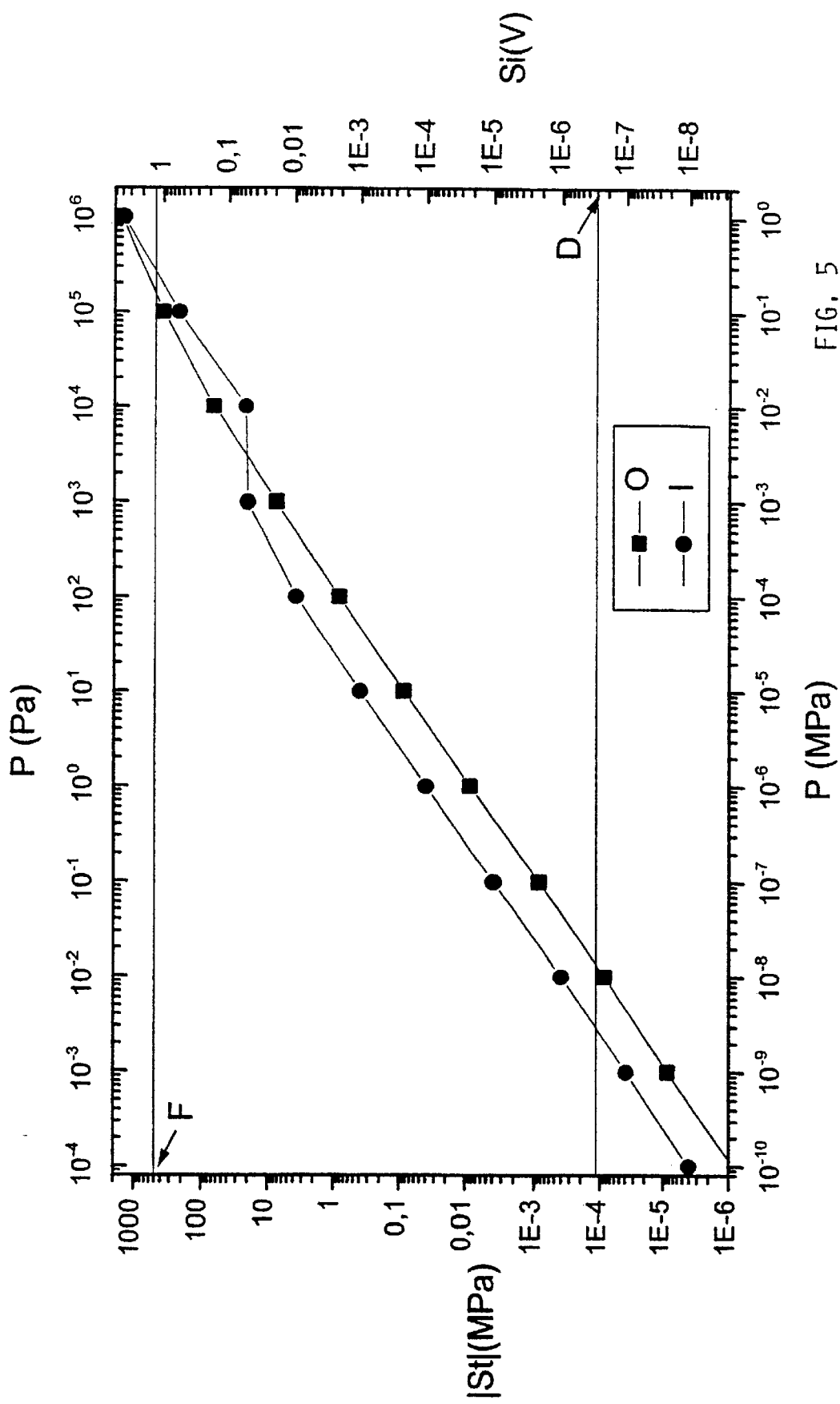
FIG. 5 illustrates the relationship between measured pressure difference and the output signal from the sensors according to the embodiment of the invention being illustrated in the other figures.

Sensors positioned in the second area 22 in the second membrane will loose sensitivity when the bend is transformed into tension or stretch. The sensors positioned on the thick membrane will, however, still measure a bend in the first area 21. This is illustrated in FIG. 5. FIG. 5 illustrates the relationship between the pressure P and the measured stretch (bend) St, corresponding to the signal Si from the sensors, both axis in a logarithmic scale. The curves show simulated values, and should thus be read as an illustration of possible measured values.

The curve marked as O shows the measured tension in the first sensors (11,12 in FIGS. 1 and 2). At lower pressures the first sensors provide a signal being below the lowest measurable value D, but has a relatively linear course at increasing pressures up to the breaking point F, which marks the largest load the sensor element can hold.

The curve marked as I shows measurable values for lower pressures, but becomes unlinear when the bend transforms into stretch, in this case at a pressure P being approx. $10^3$ Pa. This may be explains as sensor, when the membrane straightens out in the transition from bend to stretch, contracts or stops expanding in the same degree as should be justified by the change in pressure.

Using the sensor element according to the invention thus obtains an increase in the measurable range when compared to known membranes. One also obtains a combination of high sensitivity for low pressures, with a breaking strength related to more rigid and robust sensors.

In addition to silicon the membrane may be constructed in a number of materials, e.g. steel. For a steel membrane it would be natural to measure the bend with tensile sensors mounted thereon. These may be mounted in balances bridges having two in each bridge being mounted under and two on the upper side of the membrane. The bend will then provide as much stretch on one side as compression on the other.

What is claimed is:

1. Sensor element, especially for pressure sensors, comprising a first bendable membrane mounted in a rigid frame, the first bendable membrane communicating with two volumes between which a pressure difference is to be measured, the sensor element also comprising at least one second bendable membrane surrounded by the first bendable membrane at an outer edge of the second bendable membrane and communicating with said two volumes, and a transition zone between said first and second bendable membranes, said second bendable membrane having a lower stiffness than a stiffness of the first bendable membrane.

2. Sensor element according to claim 1, wherein a plurality of the sensors are mounted in the transition zone for measuring a deformation in the transition zone.

3. Sensor element according to claim 1 wherein the second bendable membrane comprises an area with increased stiffness being separated from the first bendable membrane.

4. Sensor element according to claim 1, wherein said first and second bendable membranes are made from silicon, and a difference in stiffness between said first and second bendable membranes results from a variation in a thickness of said first and second bendable membranes.

5. Sensor element according to claim 2, wherein the sensors are piezo resistive elements.

6. Sensor element according to claim 5, wherein a first half of the piezo resistive elements have an orientation parallel to an edge of the first and second bendable membranes and a second half have an orientation perpendicular to the edge of the first and second bendable membranes.

7. Sensor element according to claim 6, wherein the piezo resistive elements are coupled to a balanced bridge coupling.

8. Sensor element according to claim 1, wherein at least one of the first and second bendable membranes is rectangular.

9. Sensor element according to claim 1, wherein at least one of the first and second bendable membranes is circular.

10. Sensor element according to claim 1, wherein the first and second bendable membranes are symmetrical relative to an axis.

11. Sensor element according to claim 1, wherein a number of sensors are mounted in a second transition zone between the frame and the first membrane for measuring a deformation of the second transition zone.

12. Sensor element according to claim 1, wherein at least one of the first and second bendable membranes is quadratic.

* * * * *